United States Patent
Laaksonen et al.

(10) Patent No.: US 8,218,460 B2
(45) Date of Patent: Jul. 10, 2012

(54) NETWORK ENTITY, METHOD AND COMPUTER PROGRAM PRODUCT FOR MIXING SIGNALS DURING A CONFERENCE SESSION

(76) Inventors: Laura Laaksonen, Espoo (FI); Jussi Virolainen, Espoo (FI); Paivi Valve, Tampere (FI)

( * ) Notice: Subject to any disclaimer, the term of this patent is extended or adjusted under 35 U.S.C. 154(b) by 1429 days.

(21) Appl. No.: 11/616,351

(22) Filed: Dec. 27, 2006

(65) Prior Publication Data
US 2008/0162127 A1  Jul. 3, 2008

(51) Int. Cl.
*H04L 12/16* (2006.01)
*H04Q 11/00* (2006.01)

(52) U.S. Cl. ........ 370/265; 370/260; 370/261; 370/262; 370/263; 370/264; 348/14.08; 348/14.09; 348/14.1; 379/202.01; 379/203.01; 379/204.01; 379/205.01; 379/206.01; 455/416; 709/227; 709/228; 709/229

(58) Field of Classification Search .......................... None
See application file for complete search history.

(56) References Cited

U.S. PATENT DOCUMENTS

| | | | |
|---|---|---|---|
| 4,558,180 A | | 12/1985 | Scordo |
| 5,612,996 A | * | 3/1997 | Li ............................ 379/406.06 |
| 6,549,629 B2 | | 4/2003 | Finn et al. |
| 6,697,476 B1 | | 2/2004 | O'Malley et al. |
| 6,850,496 B1 | * | 2/2005 | Knappe et al. ................ 370/260 |
| 2002/0123895 A1 | * | 9/2002 | Potekhin et al. ............... 704/275 |
| 2003/0044654 A1 | * | 3/2003 | Holt ................................. 429/13 |
| 2003/0161276 A1 | | 8/2003 | Lundberg et al. |
| 2005/0130711 A1 | * | 6/2005 | Kang et al. ...................... 455/570 |
| 2006/0136200 A1 | * | 6/2006 | Rhemtulla et al. ............ 704/214 |

FOREIGN PATENT DOCUMENTS

| | | |
|---|---|---|
| EP | 0 680 190 A2 | 4/1995 |
| EP | 0 680 190 A | 11/1995 |
| WO | WO 00/57619 A | 9/2000 |
| WO | WO 00/57619 A1 | 9/2000 |
| WO | WO 2007/003683 | 1/2007 |

OTHER PUBLICATIONS

Office Action for Korean Application No. 10-2009-7015674 dated Jan. 10, 2011.
Office Action for Chinese Application No. 200780048460.X dated Jul. 26, 2011.
Examination Report for Vietnamese Application No. 1-2009-01596, dated Nov. 29, 2011 (3 pages).

* cited by examiner

*Primary Examiner* — Jae Y Lee
(74) *Attorney, Agent, or Firm* — Alston & Bird LLP

(57) ABSTRACT

A network entity, method and computer program product are provided for effectuating a conference session. The method may include receiving a plurality of signals representative of voice communication of the participants. In this regard, the signals may be received from a plurality of terminals of a respective plurality of participants at one of the locations, each of at least some of the terminals otherwise being configured for voice communication independent of at least some of the other terminals. The method of this aspect also includes classifying speech activity of the conference session according to a speech pause, or one or more actively-speaking participants, during the conference session. The signals of the respective participants may then be mixed into a at least one mixed signal for output to one or more other participants at one or more other locations, the signals being mixed based upon classification of the speech activity.

36 Claims, 5 Drawing Sheets

NETWORK ENTITY, METHOD AND COMPUTER PROGRAM PRODUCT FOR MIXING SIGNALS DURING A CONFERENCE SESSION

FIELD OF THE INVENTION

The present invention generally relates to systems and methods of effectuating a conference session and, more particularly, relates to systems and methods for mixing signals of participants at a particular location during effectuation of a conference session.

BACKGROUND OF THE INVENTION

A conference call is a telephone call in which at least three parties participate. Typically, conference calls can be arranged in either a distributed or a centralized manner. To establish a conference call between three parties in a distributed arrangement, for example, an originating party initiates a first call to a first terminating party. After the first call between the originating party and the first terminating party has been established, one of the parties holds the other on the line, and initiates a second call to a second terminating party. After the second call between the respective party and the second terminating party has been established, the respective party can form a conference call by bridging (connecting) the first and second calls together, thereby joining the originating party, first terminating party and second terminating party to a single conference call.

In lieu of a distributed arrangement, a conference call can be established in a centralized arrangement using a conference call service provided by an operator. In such an arrangement, for example, an originating party can initiate a conference call service request to the operator, identifying one or more parameters of the requested conference call, such as the starting time, estimated length of the conference call and other information relating the call. In response thereto, the operator assigns the calling number of a conferencing server to the requested conference call, the calling number thereafter being distributed to the conference call participants (e.g., originating party, first terminating party, second terminating party, etc.). The conference call can then be formed when the participants individually establish calls to the conferencing server via the calling number, and the conferencing server bridging (connecting) those call together to thereby joining the participants into a single conference call.

Although techniques have been developed for effectuating a conference session in distributed and centralized arrangements, it is typically desirable to improve upon existing techniques.

SUMMARY OF THE INVENTION

In view of the foregoing background, exemplary embodiments of the present invention provide an improved network entity, method and computer program product for effectuating a conference session between participants at a plurality of locations. According to one aspect of exemplary embodiments of the present invention, a method for effectuating a conference session includes receiving a plurality of signals representative of voice communication of the participants. In this regard, the signals may be received from a plurality of terminals of a respective plurality of participants at one of the locations and, if so desired, from one or more participants outside the proximity network at one or more other locations. Each of at least some of the terminals may otherwise be configured for voice communication independent of at least some of the other terminals. Further, if so desired, the terminals of the respective participants at one of the locations may be within a proximity network at the respective location.

The method of this aspect also includes classifying speech activity of the conference session according to a speech pause, or one or more actively-speaking participants, during the conference session, where the speech activity may be classified based upon the received signals. The signals of the plurality of the respective participants at one of the locations, such as those within the proximity network, may then be mixed into at least one mixed signal for output to one or more other participants at one or more other locations, such as one or more participants outside the proximity network. In this regard, the signals may be mixed based upon classification of the speech activity.

More particularly, the respective signals may be mixed according to a set of gains from a mixing table, where a plurality of those gains may be greater than zero. The mixing table including the set of gains according to which the signals are mixed may be selectable from a plurality of mixing tables based upon the classification of the speech activity. In this regard, the speech activity may be classified into one of a plurality of classes, each of which is associated with a particular mixing table. In such instances, mixing the signals may include selecting the mixing table for the class into which the speech activity is classified, and mixing the signals according to the selected mixing table.

The method may further include ranking the signals of the respective participants based upon one or more features thereof, where the signals mixed comprise the ranked signals. In such instances, the feature(s) from which the signals are ranked may be reflective of a likelihood of an actively-speaking participant such that higher-ranked signals are reflective of a higher likelihood of an actively-speaking participant. Also in such instances, mixing the signals may include associating the gains of the set of gains with respective signals of the respective participants. The signals may therefore be ranked such that larger gains of the set of gains are associated with higher-ranked signals.

According to other aspects of exemplary embodiments of the present invention, improved network entity and computer program product are provided for effectuating a conference session. Exemplary embodiments of the present invention therefore provide an network entity, method and computer program product for effectuating a conference session. As indicated above and explained in greater detail below, the network entity, method and computer program product of exemplary embodiments of the present invention may solve the problems identified by prior techniques and may provide additional advantages.

BRIEF DESCRIPTION OF THE DRAWINGS

Figure 1:
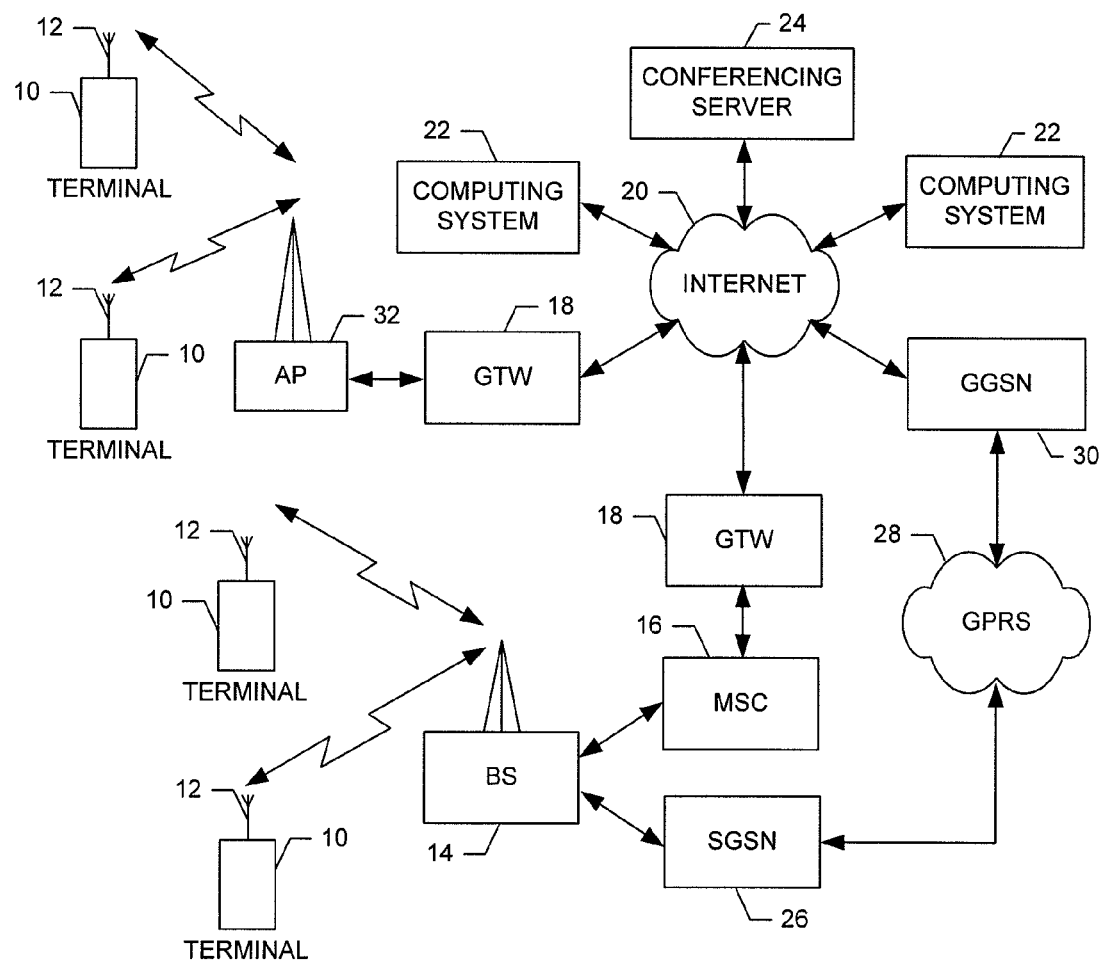
Figure 2:
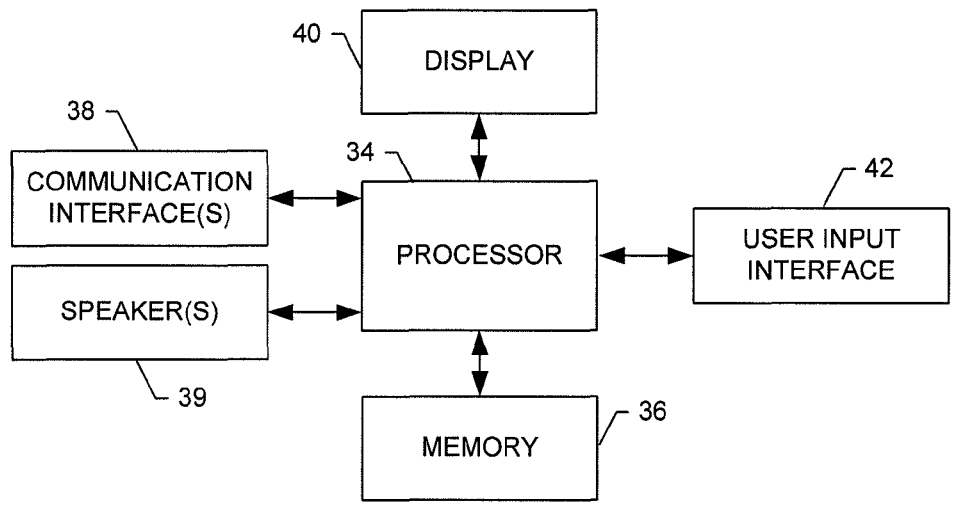
Figure 3:
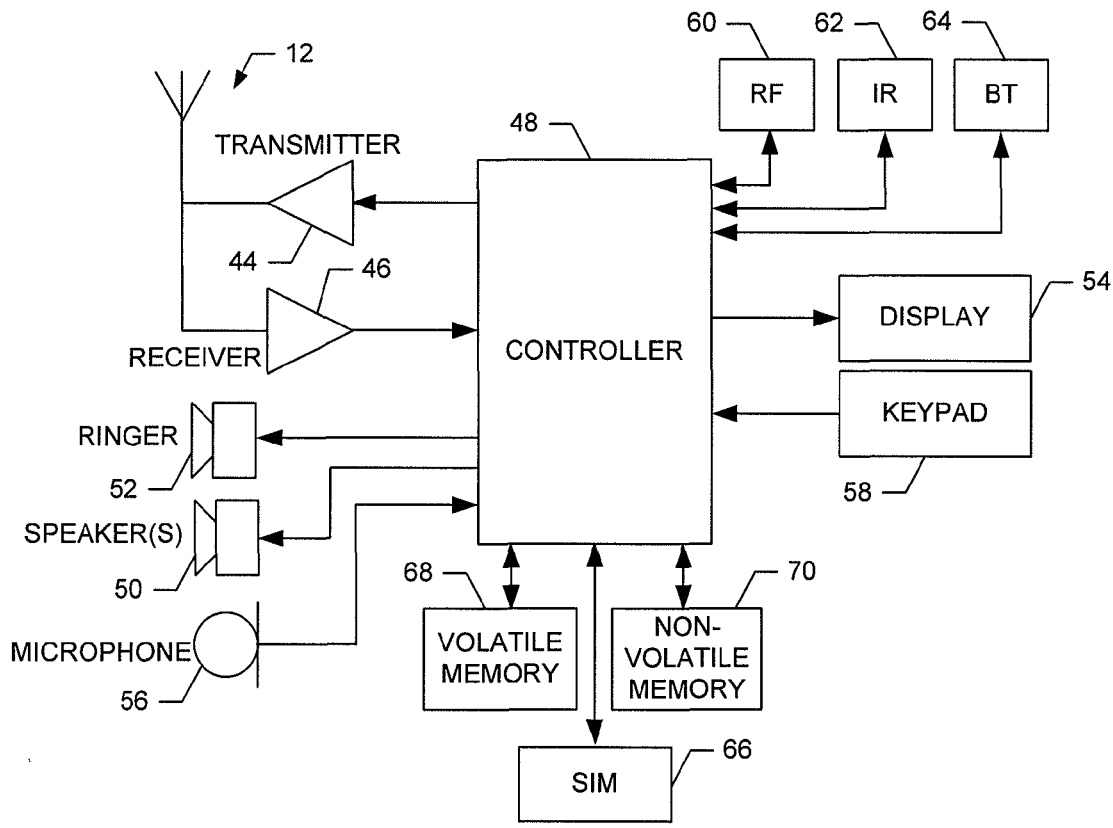
Figure 4:
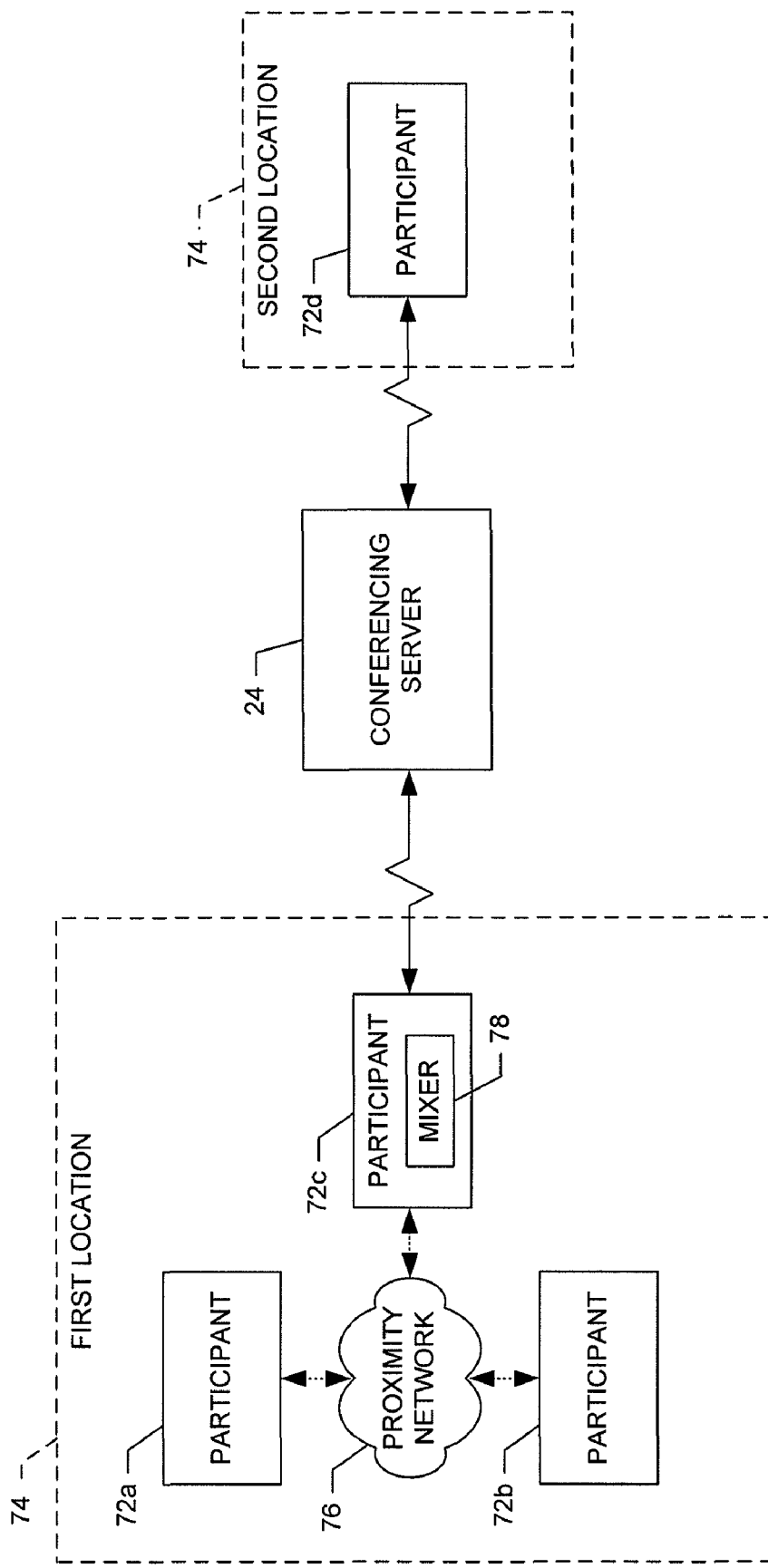
Figure 5:
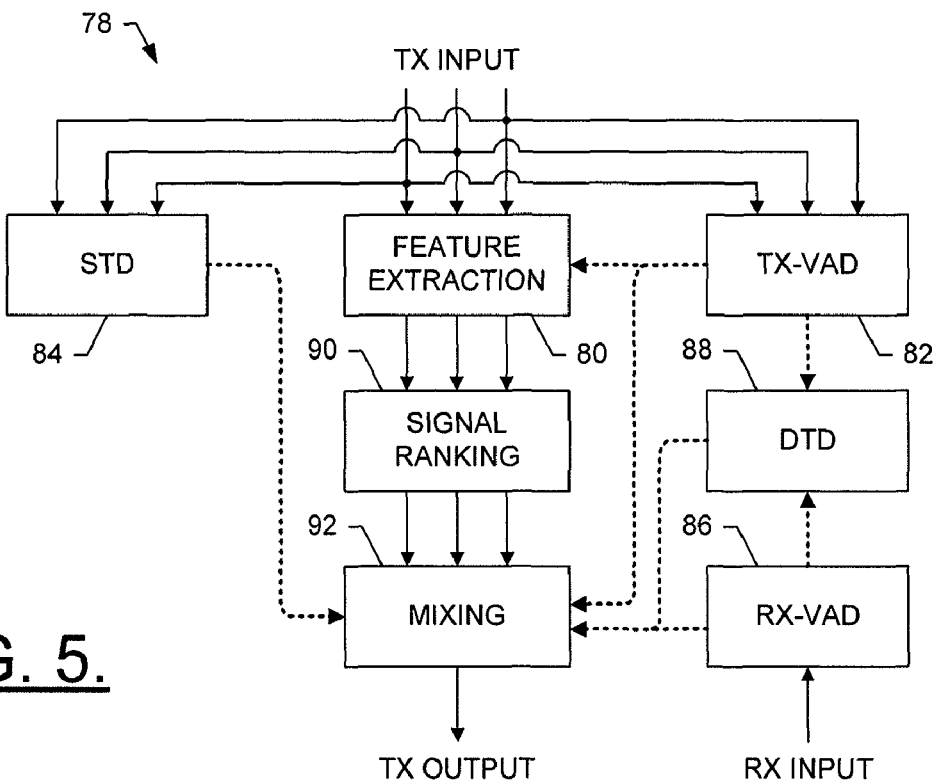
Figure 6:
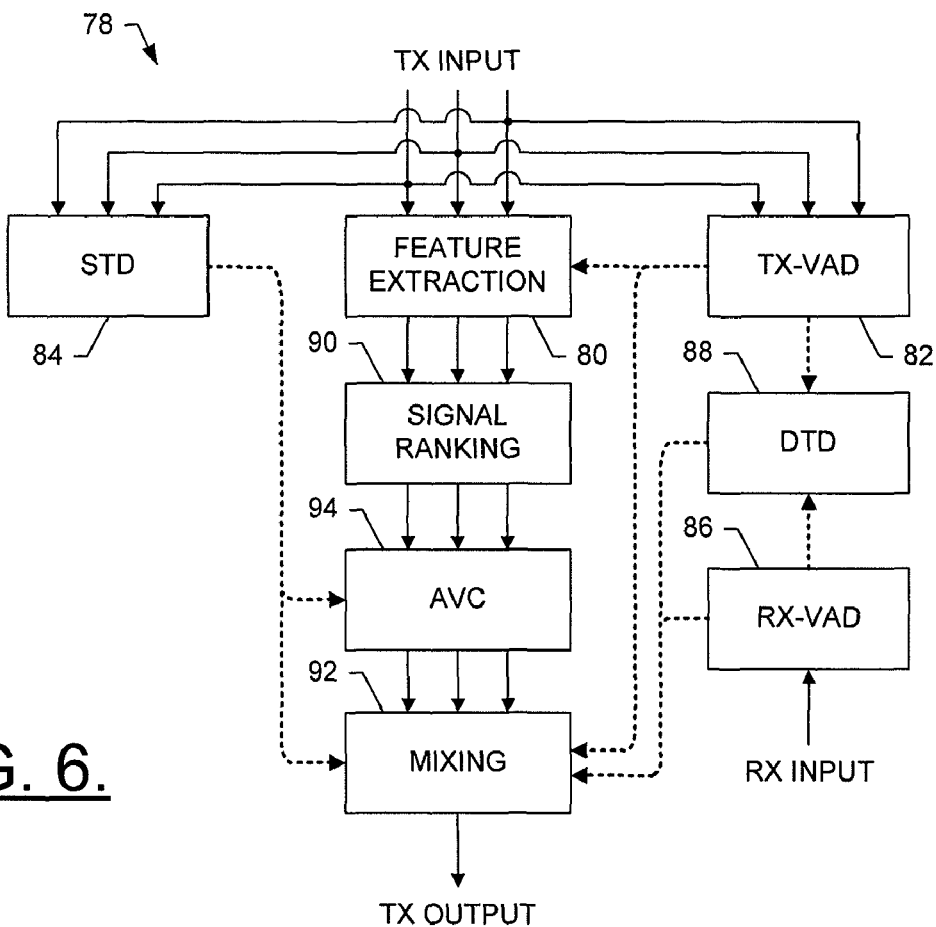
Figure 7:
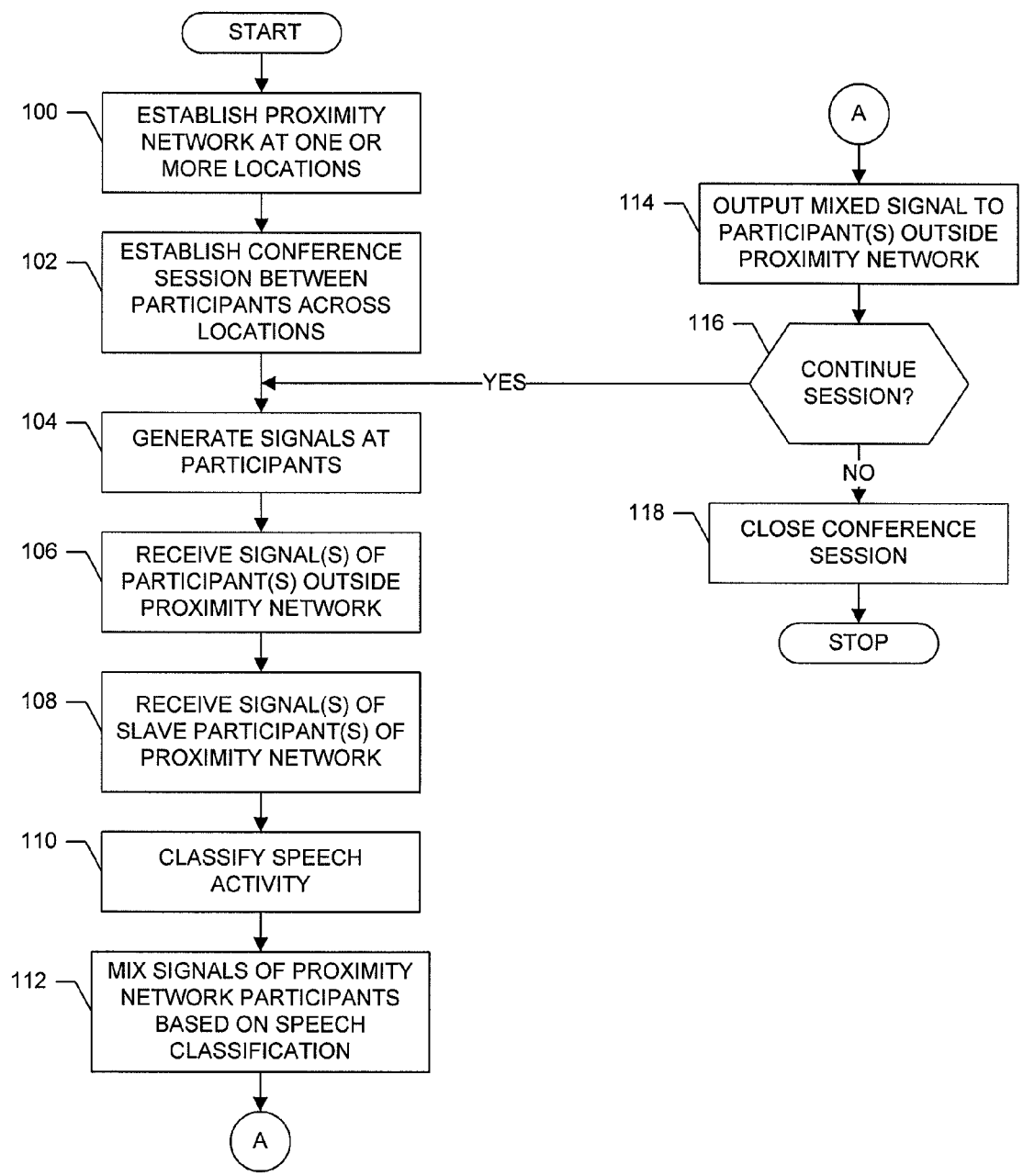

Having thus described the invention in general terms, reference will now be made to the accompanying drawings, which are not necessarily drawn to scale, and wherein:

FIG. 1 is a block diagram of one type of terminal and system according to exemplary embodiments of the present invention;

FIG. 2 is a schematic block diagram of an entity capable of operating as a terminal, computing system and/or conferencing server, in accordance with exemplary embodiments of the present invention;

FIG. 3 is a schematic block diagram of a terminal comprising a mobile station, in accordance with one exemplary embodiment of the present invention;

FIG. 4 is a functional block diagram of a plurality of participants effectuating a conference session via a conferencing server, in accordance with one exemplary embodiment of the present invention;

FIGS. 5 and 6 functional block diagrams of a mixer of exemplary embodiments of the present invention; and FIG. 7 is a flowchart illustrating various steps in a method of establishing and effectuating a conference session, in accordance with exemplary embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, one or more terminals 10 may each include an antenna 12 for transmitting signals to and for receiving signals from a base site or base station (BS) 14. The base station is a part of one or more cellular or mobile networks each of which includes elements required to operate the network, such as a mobile switching center (MSC) 16. As well known to those skilled in the art, the mobile network may also be referred to as a Base Station/MSC/Interworking function (BMI). In operation, the MSC is capable of routing calls to and from the terminal when the terminal is making and receiving calls. The MSC can also provide a connection to landline trunks when the terminal is involved in a call. In addition, the MSC can be capable of controlling the forwarding of messages to and from the terminal, and can also control the forwarding of messages for the terminal to and from a messaging center.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 18, and the GTW is coupled to a WAN, such as the Internet 20. In turn, devices such as processing elements (e.g., personal computers, server computers or the like) can be coupled to the terminal 10 via the Internet. For example, as explained below, the processing elements can include one or more processing elements associated with a computing system 22 (two shown in FIG. 1), conferencing server 24 (one shown in FIG. 1) or the like, as described below.

The BS 14 can also be coupled to a signaling GPRS (General Packet Radio Service) support node (SGSN) 26. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 28. The packet-switched core network is then coupled to another GTW, such as a GTW GPRS support node (GGSN) 30, and the GGSN is coupled to the Internet. In addition to the GGSN, the packet-switched core network can also be coupled to a GTW 18. Also, the GGSN can be coupled to a messaging center. In this regard, the GGSN and the SGSN, like the MSC, can be capable of controlling the forwarding of messages, such as MMS messages. The GGSN and SGSN can also be capable of controlling the forwarding of messages for the terminal to and from the messaging center.

In addition, by coupling the SGSN 26 to the GPRS core network 28 and the GGSN 30, devices such as a computing system 22 and/or conferencing server 24 can be coupled to the terminal 10 via the Internet 20, SGSN and GGSN. In this regard, devices such as a computing system and/or conferencing server can communicate with the terminal across the SGSN, GPRS and GGSN. By directly or indirectly connecting the terminals and the other devices (e.g., computing system, conferencing server, etc.) to the Internet, the terminals can communicate with the other devices and with one another, such as according to the Hypertext Transfer Protocol (HTTP), to thereby carry out various functions of the terminal.

Although not every element of every possible mobile network is shown and described herein, it should be appreciated that the terminal 10 can be coupled to one or more of any of a number of different networks through the BS 14. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The terminal 10 can further be coupled to one or more wireless access points (APs) 32. The APs can comprise access points configured to communicate with the terminal in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs may be coupled to the Internet 20. Like with the MSC 16, the APs can be directly coupled to the Internet. In one embodiment, however, the APs are indirectly coupled to the Internet via a GTW 18. As will be appreciated, by directly or indirectly connecting the terminals and the computing system 22, conferencing server 24, and/or any of a number of other devices, to the Internet, the terminals can communicate with one another, the computing system, etc., to thereby carry out various functions of the terminal, such as to transmit data, content or the like to, and/or receive content, data or the like from, the computing system. As used herein, the terms "data," "content," "information" and similar terms may be used interchangeably to refer to data configured for being transmitted, received and/or stored in accordance with embodiments of the present invention. Thus, use of any such terms should not be taken to limit the spirit and scope of the present invention.

Although not shown in FIG. 1, in addition to or in lieu of coupling the terminal 10 to computing systems 22 across the Internet 20, the terminal and computing system can be coupled to one another and communicate in accordance with, for example, RF, BT, IrDA or any of a number of different wireline or wireless communication techniques, including LAN, WLAN, WiMAX and/or UWB techniques. One or more of the computing systems can additionally, or alternatively, include a removable memory configured for storing content, which can thereafter be transferred to the terminal. Further, the terminal 10 can be coupled to one or more electronic devices, such as printers, digital projectors and/or other multimedia capturing, producing and/or storing devices (e.g., other terminals). Like with the computing systems 22, the terminal can be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Referring now to FIG. 2, a block diagram of an entity capable of operating as a terminal 10, computing system 22 and/or conferencing server 24, is shown in accordance with one embodiment of the present invention. Although shown as separate entities, in some embodiments, one or more entities may support one or more of a terminal, conferencing server and/or computing system, logically separated but co-located within the entit(ies). For example, a single entity may support a logically separate, but co-located, computing system and conferencing server. Also, for example, a single entity may support a logically separate, but co-located terminal and computing system. Further, for example, a single entity may support a logically separate, but co-located terminal and conferencing server.

The entity capable of operating as a terminal 10, computing system 22 and/or conferencing server 24 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can include a processor 34 connected to a memory 36. The memory can comprise volatile and/or non-volatile memory, and typically stores content, data or the like. For example, the memory typically stores content transmitted from, and/or received by, the entity. Also for example, the memory typically stores client applications, instructions or the like for the processor to perform steps associated with operation of the entity in accordance with embodiments of the present invention. As explained below, for example, the memory can store client application(s).

As described herein, the client application(s) may each comprise software operated by the respective entities. It should be understood, however, that any one or more of the client applications described herein can alternatively comprise firmware or hardware, without departing from the spirit and scope of the present invention. Generally, then, the terminal 10, computing system 22 and/or conferencing server 24 can include one or more logic elements for performing various functions of one or more client application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with a respective network entity (i.e., terminal, computing system, conferencing server, etc.) or more particularly, for example, a processor 34 of the respective network entity. The design of integrated circuits is by and large a highly automated process. In this regard, complex and powerful software tools are available for converting a logic level design into a semiconductor circuit design ready to be etched and formed on a semiconductor substrate. These software tools automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the memory 36, the processor 34 can also be connected to at least one interface or other means for displaying, transmitting and/or receiving data, content or the like. In this regard, the interface(s) can include at least one communication interface 38 or other means for transmitting and/or receiving data, content or the like. As explained below, for example, the communication interface(s) can include a first communication interface for connecting to a first network, and a second communication interface for connecting to a second network. In addition to the communication interface(s), the interface(s) can also include at least one user interface that can include one or more earphones and/or speakers 39, a display 40, and/or a user input interface 42. The user input interface, in turn, can comprise any of a number of devices allowing the entity to receive data from a user, such as a microphone, a keypad, a touch display, a joystick or other input device.

Reference is now made to FIG. 3, which illustrates one type of terminal 10 that would benefit from embodiments of the present invention. It should be understood, however, that the terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

The terminal 10 includes various means for performing one or more functions in accordance with exemplary embodiments of the present invention, including those more particularly shown and described herein. It should be understood, however, that the terminal may include alternative means for performing one or more like functions, without departing from the spirit and scope of the present invention. More particularly, for example, as shown in FIG. 3, in addition to an antenna 12, the terminal 10 includes a transmitter 44, a receiver 46, and a controller 48 that provides signals to and receives signals from the transmitter and receiver, respectively. These signals include signaling information in accordance with the air interface standard of the applicable cellular system, and also user speech and/or user generated data. In this regard, the terminal can be configured for operating with one or more air interface standards, communication protocols, modulation types, and access types. More particularly, the terminal can be configured for operating in accordance with any of a number of first generation (1G), second generation (2G), 2.5G and/or third-generation (3G) communication protocols or the like. For example, the terminal may be configured for operating in accordance with 2G wireless communication protocols IS-136 (TDMA), GSM, and IS-95 (CDMA). Also, for example, the terminal may be configured for operating in accordance with 2.5G wireless communication protocols GPRS, Enhanced Data GSM Environment (EDGE), or the like. Further, for example, the terminal may be configured for operating in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 48 includes the circuitry required for implementing the audio and logic functions of the terminal 10. For example, the controller may be comprised of a digital signal processor device, a microprocessor device, and various analog-to-digital converters, digital-to-analog converters, and other support circuits. The control and signal processing functions of the terminal are allocated between these devices according to their respective capabilities. The controller can additionally include an internal voice coder (VC), and may include an internal data modem (DM). Further, the controller may include the functionality to operate one or more software programs, which may be stored in memory (described below). For example, the controller may be configured for operating a connectivity program, such as a conventional Web browser. The connectivity program may then allow the terminal to transmit and receive Web content, such as according to HTTP and/or the Wireless Application Protocol (WAP), for example.

The terminal 10 also comprises a user interface including one or more earphones and/or speakers 50, a ringer 52, a display 54, and a user input interface, all of which are coupled to the controller 48. The user input interface, which allows the terminal to receive data, can comprise any of a number of devices allowing the terminal to receive data, such as a microphone 56, a keypad 58, a touch display and/or other input device. In embodiments including a keypad, the keypad includes the conventional numeric (0-9) and related keys (#, *), and other keys used for operating the terminal. Although not shown, the terminal can include a battery, such as a vibrating battery pack, for powering the various circuits that are required to operate the terminal, as well as optionally providing mechanical vibration as a detectable output.

The terminal 10 can also include one or more means for sharing and/or obtaining data. For example, the terminal can include a short-range radio frequency (RF) transceiver or interrogator 60 so that data can be shared with and/or obtained from electronic devices in accordance with RF techniques. The terminal can additionally, or alternatively, include other short-range transceivers, such as, for example an infrared (IR) transceiver 62, and/or a Bluetooth (BT) transceiver 64 operating using Bluetooth brand wireless technology developed by the Bluetooth Special Interest Group. The terminal can therefore additionally or alternatively be configured for transmitting data to and/or receiving data from electronic devices in accordance with such techniques. Although not shown, the terminal can additionally or alternatively be configured for transmitting and/or receiving data from electronic devices according to a number of different wireless networking techniques, including WLAN, WiMAX, UWB techniques or the like. The terminal 10 can further include memory, such as a subscriber identity module (SIM) 66, a removable user identity module (R-UIM) or the like, which typically stores information elements related to a mobile subscriber. In addition to the SIM, the terminal can include other removable and/or fixed memory. In this regard, the terminal can include volatile memory 68, such as volatile Random Access Memory (RAM) including a cache area for the temporary storage of data. The terminal can also include other non-volatile memory 70, which can be embedded and/or may be removable. The non-volatile memory can additionally or alternatively comprise an EEPROM, flash memory or the like. The memories can store any of a number of pieces of information, and data, used by the terminal to implement the functions of the terminal. For example, the memories can store an identifier, such as an international mobile equipment identification (IMEI) code, international mobile subscriber identification (IMSI) code, mobile station integrated services digital network (MSISDN) code (mobile telephone number), Session Initiation Protocol (SIP) address or the like, capable of uniquely identifying the mobile station, such as to the MSC 16. In addition, the memories can store one or more client applications configured for operating on the terminal.

In accordance with exemplary embodiments of the present invention, a conference session can be established between a plurality of participants via a plurality of devices (e.g., terminal 10, computing system 22, etc.) in a distributed or centralized arrangement via a conferencing server 24. The participants can be located at a plurality of remote locations that each includes at least one participant. For at least one of the locations including a plurality of participants, those participants can form a proximity network or otherwise be located in a common acoustic space. During the conference session, then, the participants' devices can generate signals representative of audio or speech activity adjacent to and thus picked up by the respective devices. The signals can then be mixed into an output signal for communicating to other participants of the conference session.

Reference is now drawn to FIG. 4, which illustrates a functional block diagram of a plurality of conference participants 72 establishing and thereafter effectuating a conference session. As indicated above, at least some of the participants may be associated with respective devices (e.g., terminal 10, computing system 22, etc.) for carrying out communication during the conference session. Thus, as explained below, the term "participant" can refer to a participant and/or the participant's associated device. As shown, the conference session is configured in a centralized arrangement via a conferencing server 24. It should be understood, however, that the conference session may alternatively be established and effectuated in a distributed arrangement without a conferencing server, if so desired. Irrespective of the particular arrangement of the conference session, the participants are located at a plurality of remote locations 74 that each includes at least one participant.

At one or more of the remote locations 74, at least some of the participants 72 of the respective location may establish a proximity network 76 for the exchange of voice communication. As used herein, the term "voice communication" may refer to voice and/or other audio communication, which may be carried or otherwise represented by signals from respective participants. Similarly, the term "speech activity" may generally refer to voice and/or other audio.

The proximity network 76 can be established in accordance with any of a number of different communication techniques such as RF, BT, IrDA, and/or any of a number of different wireless and/or wireline networking techniques such as LAN, WLAN, WiMAX and/or UWB techniques. Within a proximity network, one of the participants may function as a master while the one or more other participants function as slaves for the exchange of voice communication. In this regard, as explained below, the master of a proximity network can be configured for controlling the exchange or other transfer of voice communication between the participants in the respective proximity network and the participants outside the respective proximity network. As shown in FIG. 4, for example, the first location includes participants 72a-72c, where participants 72a and 72b function as slaves, and participant 72c functions as a master.

During the conference session, the participants 72, including those within respective proximity network(s) 76, can exchange voice communication in a number of different manners. For example, at least some, of the participants of a proximity network can exchange voice communication with the other participants independent of the respective proximity network but via one of the participants (e.g., the master) or via another entity in communication with the participants, as such may be the case when the device of one of the participants or another device within the proximity network is capable of functioning as a speakerphone. Also, for example, at least some, if not all, of the participants of a proximity network can exchange voice communication with other participants via the proximity network and one of the participants (e.g., the master) or another entity within the proximity network and in communication with the participants. It should be understood, then, that participants within a proximity network may exchange voice communication in any of a number of different manners.

To facilitate effectuation of a conference session for the participants 72 in a respective proximity network 76, the master (e.g., participant 72c) may be configured for operating a mixer 78 for obtaining signals carrying or otherwise representing voice communication of participants 72 of the respective proximity network, and mixing those signals for output to the respective participants and/or the participants outside the proximity network (e.g., participant 72d). As shown and described herein, the mixer 78 comprises software operable by a respective network entity (e.g., participant 72c). It should be understood, however, that the mixer can alternatively comprise firmware or hardware, without departing from the spirit and scope of the present invention. Also, although the mixer is shown and described as being local to the master of a proximity network, the mixer can alternatively be distributed from the master, such as within the conferencing server 24. Further, as shown and described herein, voice communication (or signals carrying or otherwise representing the voice communication) is provided, exchanged or otherwise transferred from one or more participants to one or more other participants. It should be understood, however, that the terms "providing," "exchanging" and "transferring" can be used herein interchangeably, and that providing, exchanging or transferring voice communication can include, for example, moving or copying voice communication, without departing from the spirit and scope of the present invention.

In accordance with exemplary embodiments of the present invention, the mixer 78 may be configured for mixing the signals of participants 72 within a proximity network 76 at a particular location, communicated over respective communication channels, may be mixed into an output for communication to the participants at other locations outside the respective proximity network. In this regard, the mixed output may include a weighted sum of the input signals, such as in the following manner:

$$s_{out} = \sum_{n=1}^{N} g_n s_n$$

In the preceding, $s_{out}$ represents the output signal, n=1, 2, ... N represent each of N channels for respective participants at the particular location, $s_n$ represents a signal from the nth input channel (of the nth of N participants) and $g_n$ represents a weight or gain given to the signal from the nth input channel. As explained herein, signals from the participants may be communicated over respective channels. Thus, the terms "signal" and "channel" may be used interchangeably or in combination to refer to a signal over a channel of a participant.

The gains given to the respective signals may depend upon a number of different factors including, for example, a ranking of the channels and/or speech activity information. In this regard, the signals may be ranked according to an estimated proximity of speech activity near the participants' devices 72 within a respective proximity network 76. The gains for the ranked signals may then be obtained from mixing tables separately defined for different classes of speech activity including, for example, the following:
  a) Speech pause (no actively speaking participants);
  b) Transmitter talk (one local, actively speaking participant);
  c) Simultaneous talk (multiple local, actively speaking participants);
  d) Receiver talk (one remote, actively speaking participant);
  e) Double talk (local and remote actively speaking participants); and
  f) Simultaneous/double talk (multiple local, actively speaking participants, and one or more remote, actively speaking participants).

These mixing tables may be designed in a number of different manners, and in accordance with a number of different principles. During a speech pause where none of the participants of the conference session (in or out of a respective proximity network 76) are actively speaking, for example, the gains may be set to approximately zero or close to zero, and/or comfort noise may be added to the output with the gains all set to approximately zero.

During transmitter talk, for example, the signals of those participants 72 in a respective proximity network 76 may be ranked according to their relative strengths such that the signal of the likely actively-speaking participant (within the proximity network) is ranked first. The first-ranked signal may then be given the largest gain since that signal likely has the most desirable signal-to-noise ratio (SNR) and reverberation conditions. Then, depending on the reliability of the ranking procedure, the gains of the other signals may be set to approximately zero or close to zero. In this regard, if the ranking procedure has a high reliability such that the risk for transmitting a non-optimal signal is low, the gains for the other signals may be set to approximately zero. If the ranking procedure has a lower reliability such that the risk for transmitting a non-optimal signal is higher, however, the gains for the other signals may be set to a value close to zero. For example, if the ranking procedure has high reliability, the gains for the other signals may be set to approximately 0-30% of the gain of the first-ranked signal; or if the ranking procedure has lower reliability, the gains of the other signals may be set to approximately 70-90% of the gain of the first-ranked signal.

Similar to transmitter talk, during simultaneous talk, for example, the signals of those participants 72 in a respective proximity network 76 may be ranked according to their relative strengths such that the signals of the likely actively-speaking participants (within the proximity network) are ranked at the top. The top-ranked signals may then be given the largest gains since those signals likely have the most desirable SNR and reverberation conditions. As permitting an increased number of simultaneous speaking participants may increase the difficulty of comprehending the output, the number of top-ranked signals may be limited to a predefined number of speaking participants. For example, the number of local, simultaneously speaking participants may be limited to two such that the two strongest signals are ranked first and second, and given the largest gains. And again, similar to transmitter talk, the gains of the other signals may be set to approximately zero or close to zero, depending on the reliability of the ranking procedure.

During receiver talk where none of the participants 72 within the proximity network 76 are actively speaking, for example, the gains of the signals of those participants may be set to a lower value, and if so desired (and particularly for cases where the gains are set close to zero), comfort noise may be added to the output.

During double talk, for example, the signals of those participants 72 in a respective proximity network 76 may again be ranked according to their relative strengths such that the signal of the likely actively-speaking participant (within the proximity network 76) is ranked first. The first-ranked signal may then be given the largest gain since that signal likely has the most desirable SNR and reverberation conditions. The gains of the other signals may be set to a value lower than that of the first-ranked signal, but higher than would be assigned to those other signals in the case of transmitter talk. This may be the case since an implemented echo-cancellation algorithm may easily start to clip the signal, and by summing several signals, mixing of the signals may at least to some extent compensate for this undesirable effect.

And during simultaneous/double talk, the signals of those participants 72 in a respective proximity network 76 may be ranked, and the top-ranked signals assigned gains, in a manner similar to that in the case of simultaneous talk. The gains of the other signals, however, may be set in a manner similar to that in the case of double talk to, again, compensate for possible problems in echo cancellation.

Further to assigning gains to the proximity-network participants' signals and summing the resulting weighted signals, the mixer 78 may include automatic volume control (AVC) for equalizing volume levels of one or more of those signals. The signal volume levels may be equalized before or during mixing of the signals, but by equalizing the signals before mixing the signals, the same mixing algorithm may be applicable to instances including AVC, as well as instances without AVC. Irrespective of when the signal volume levels are equalized in appropriate instances, various ones of the signal levels may be equalized based upon voice activity detection (VAD) and/or simultaneous talk detection (STD) information. In the case of transmitter talk, for example, the level of the first-ranked signal may be equalized to a predefined target level. And in the case of simultaneous talk, for example, the levels of the top-ranked signals (e.g., top two ranked signals) may be equalized to a predefined target level.

Reference is now made to FIG. 5, which illustrates a functional block diagram of a mixer 78, in accordance with one exemplary embodiment of the present invention. Initially, it should be noted that the mixer may be configured for operation with respect to wideband ($f_s$=16 kHz) and/or narrowband ($f_s$=8 kHz) speech, and/or a number of other bandwidths. It should also be noted that the mixer may be configured for mixing speech signals formatted in a number of different manners. In one exemplary embodiment, for example, the mixer is configured for mixing speech signals formatted in frames of any of a number of different lengths, such as any of a number of different lengths between approximately 10 ms and 30 ms.

As shown in FIG. 5, the mixer 78 may include a feature extraction element 80, a voice activity detection (VAD) element 82 (shown as TX-VAD) and a simultaneous talk detection (STD) element 84 configured for receiving signals (shown as TX input) from respective participants 72 within a proximity network 76 (e.g., participants 72a, 72b and 72c) during a conference session that are. These signals may carry or otherwise represent voice communication between the participants within the proximity network.

The feature extraction element 80 may be configured for extracting or otherwise determining a set of descriptive features, or feature vectors, from respective signals. The value of the respective features for an input channel (for a particular participant) may comprise an absolute value. In various instances, however, the value for one or more respective features may comprise a relative value (relative to values of the corresponding feature from other input channels). And although the feature extraction element may be configured for extracting or otherwise determining any of a number of features from respective signals, the features of one exemplary embodiment include, for example, a frame energy ratio, signal-to-noise ratio (SNR) and short-term-to-long-term energy ratio.

The frame energy ratio for a frame of the signal from the nth input channel may comprise the ratio of the energies of the current frame and the immediately preceding frame. In this regard, the largest frame energy may be associated with the channel of the participant device 72 closest to speech activity near the participant devices within the proximity network 76, which may correspond to the participant device of an actively-speaking participant. Also, a beginning of speech burst after a silence or speech pause may be observed by virtue of the participant device closest to the aforementioned speech activity, and as such, the frame energy ratio may be considered a rough estimate of a time-delay-of-arrival (TDOA) measurement. Written notationally, the frame energy ratio for the kth frame of the signal $s_n$ from the nth participant (from the nth input channel) may be determined as follows:

$$ER_n(k) = \frac{E[s_n(k)]}{E[s_n(k-1)]}$$

In the preceding, $ER_n(k)$ represents the frame energy ratio, and $E[\ ]$ represents an energy. It should also be noted that, as the frame energy ratio is a frame-based feature, the accuracy of the frame energy ratio may decrease as the length of the frames from which it may be determined increases.

The SNR feature for a frame of the signal from the nth input channel may comprise the ratio of signal energy to total energy (including signal and noise energies). Similar to the energy ratio feature, the largest SNR may be associated with the channel of the participant device 72 closest to speech activity near the participant devices within the proximity network 76, which may correspond to the participant device of an actively-speaking participant. Written notationally, the SNR for the kth frame of the signal $s_n$ from the nth participant (from the nth input channel) may be determined as follows:

$$SNR_n(k) = \frac{E[s_n(k)] - \hat{E}[\text{noise}(k)]}{E[s_n(k)]}$$

In the preceding, $SNR_n(k)$ represents the SNR; $E[s_n(k)]$ represents the total energy of the kth frame of the signal $s_n$, including signal energy and noise energy; and $\hat{E}[\text{noise}(k)]$ represents an estimated background noise energy of the kth frame. The estimated background noise energy may be calculated or otherwise determined in any of a number of different manners including, for example, in accordance with a minimum statistics technique.

The short-term-to-long-term-energy ratio for a frame of the signal from the nth input channel may comprise the ratio of short-term to long-term frame energies, each of which may comprise an infinite-impulse response (IIR)-filtered frame energy. Similar to the frame energy ratio and SNR features, the largest short-term-to-long-term-energy ratio may be associated with the channel of the participant device 72 closest to speech activity near the participant devices within the proximity network 76, which may correspond to the participant device of an actively-speaking participant. Written notationally, the short-term-to-long-term-energy ratio for the kth frame of the signal $s_n$ from the nth participant (from the nth input channel) may be determined as follows:

$$ER_{\text{short-to-long},n}(k) = \frac{E_{\text{IIR-short},n}[s_n(k)]}{E_{\text{IIR-long},n}[s_n(k)]}$$

In the preceding, $ER_{\text{short-to-long},n}(k)$ represents the short-term-to-long-term-energy ratio, and $E_{\text{IIR-short},n}[s_n(k)]$ and $E_{\text{IIR-long},n}[s_n(k)]$ represent IIR-filtered, short-term and long-term frame energies, respectively. The frame energies may be calculated or otherwise determined in any of a number of different manners. In one embodiment, for example, the frame energies may be determined from the following IIR filter:

$$H(z) = \frac{1-a}{1+az^{-1}},$$

In the preceding, a represents the attack time constant for increasing energy (the time required for the energy of a signal, once detected, to reach a predefined percentage of its final value), and the release constant for decreasing energy (the time required for the energy of a signal to decrease from its final value to a predefined percentage thereof). The attack/release time constant may be selected in a number of different manners for the respective short-term and long-term energies, but in one exemplary embodiment, the attack/release constant for determining the short-term energy may be set lower than the attack/release constant for determining the long-term energy.

The VAD element 82 (first VAD element) and the STD element 84 may be configured for classifying local speech activity (e.g., activity among the participants 72 within the proximity network 76) based upon the respective signals. In this regard, the VAD element may be configured for classifying speech activity as a speech pause or transmitter talk, and the STD element may be configured for classifying speech activity as simultaneous talk, as appropriate. Similarly, the mixer 78 may further include a second VAD element 86 (shown as RX-VAD) for classifying remote speech activity as a speech pause or receiver talk, and a double-talk detection (DTD) element 88 for classifying local and remote speech activity as double-talk, as appropriate.

The VAD, STD and DTD elements 82, 84, 86 and 88 may be configured for classifying local and/or remote speech activity in any of a number of different manners, at least some of which are well known to those skilled in the art. More particularly, for example, the VAD elements may be configured for classifying a frame of the signal from the nth input channel as a speech pause or transmitter/receiver talk in accordance with an energy-based method whereby short-term signal energy may be compared with estimated background noise energy. In such instances, the frame of the signal may be classified as a speech pause when the short-term energy is less than or approximately equal to the estimated background noise energy.

For a frame of a signal of a participant 72 outside the proximity network 76 received by the second VAD element 86, the second VAD element may output a VAD flag ($VAD_{Rx}(k)$) set to 0 indicating its classification as a speech pause, or set to 1 indicating its classification as receiver talk. The first VAD element 82 may similarly set a VAD flag for each of the N input channels ($VAD_n(k)$, n=1, 2, ... N). But instead of outputting all of the respective VAD flags, the first VAD element may output a VAD flag ($VAD_{Tx}(k)$) representative of collective local speech activity across all of the participants 72 within the proximity network. This flag may, for example, be set to 1 indicating that any of the input channel flags are set to 1; and otherwise be set to 0. Notationally, the output of the first VAD flag may be set as the Boolean union of the VAD flags for the input channels:

$$VAD_{Tx}(k) = \bigcup_{n=1}^{N} VAD_n(k)$$

As further shown, the output of the first VAD element 82 may be received by the feature extraction element 80 to facilitate the extraction of one or more features based thereupon. For example, the VAD flag may be received by the feature extraction element such that the feature extraction element determines the SNR based thereupon, such as by updating a SNR estimate only during active speech ($VAD_{Tx}(k)=1$).

The DTD element 88 may, for example, classify local and remote speech activity as double-talk based upon the outputs of the first and second VAD elements 82, 86 ($VAD_n(k)$ and $VAD_{Tx}(k)$). Similar to the VAD elements, for a frame of the signals of participants within the proximity network 76, and corresponding frame of a signal from one or more participants outside the proximity network, the DTD element may output a DTD flag (DTD (k)) set to 1 indicating the frame's classification, and thus the speech activity classification, as double-talk; and otherwise set to 0. More particularly, for example, the DTD flag may be set to 1 if the flags from both the first and second VAD elements are set to 1; and otherwise be set to 0. Notationally, the output of the DTD element may be set as the Boolean intersection of the VAD flags from the first and second VAD elements:

$$DTD(k) = VAD_{Tx}(k) \cap VAD_{Rx}(k)$$

The STD element 84 may, for example, classify speech activity as simultaneous talk based upon a blind-source separation technique, such as ICA (independent component analysis). Additionally or alternatively, the STD element may be configured to calculate a fundamental frequency estimation from which simultaneous actively-speaking participants may be identified. Similar to the VAD and DTD elements 82, 86 and 88, the STD element may output a STD flag (STD (k)) set to 1 indicating the frame's classification, and thus the speech activity classification, as simultaneous-talk; and otherwise set to 0.

In addition to the VAD, STD and DTD elements 82, 84, 86 and 88, the mixer 78 may further include a signal-ranking element 90 for ranking the signals of proximity-network participants 72 for respective frames, $s_n(k)$, n=1, 2, . . . N; and outputting ranked signals $s_{rank-r}(k)$, r=1, 2, 3, . . . R=N. The signal-ranking element may be configured for ranking these local signals in any of a number of different manners. In one embodiment, for example, the signal-ranking element may rank the signals in an order representative of an estimated proximity of respective proximity-network participant devices to local speech activity (i.e., speech activity near the proximity-network participant devices). In this regard, the signal-ranking element may rank the signals based upon one or more of their extracted features, such as their frame energy ratios $ER_n(k)$, signal-to-noise ratios $SNR_n(k)$, and/or short-term-to-long-term-energy ratios $ER_{short-to-long,n}(k)$.

More particularly, for example, the input channel signal with the largest frame energy ratio (i.e., $ER_n(k)=ER_{Max}(k)$) may be ranked first (i.e., $s_{rank-1}(k)$) if that frame energy ratio exceeds a first predefined threshold (and not in the previous frame k−1), and the respective input channel signal also has the largest signal-to-noise ratio (i.e., $SNR_n(k)=SNR_{Max}(k)$) and short-term-to-long-term-energy ratio (i.e., $ER_{short-to-long,n}(k)=ER_{short-to-long,Max}(k)$). In this regard, when a participant begins speaking, the value of energy ratio may suddenly increase ($ER_n(k)>ER_n(k-1)$) since the previous frame may only include the energy of the background noise, and the current frame may include both the speech energy and the energy of the background noise. Exceeding the first predefined threshold, then, may be interpreted as the frame including speech and not—merely noise.

In instances in which the largest frame energy ratio exceeds a first predefined threshold (and not in the previous frame k−1), and the respective input channel signal also has the largest signal-to-noise ratio and short-term-to-long-term-energy ratio, with the respective input channel thereby being ranked first, the input channel with the second-largest frame energy ratio may be ranked second (i.e., $s_{rank-2}(k)$) if that frame energy ratio exceeds a second predefined threshold. In such instances, the second predefined threshold may be the same or different from the first predefined threshold. If the second-largest frame energy ratio of the respective input channel does not exceed the second predefined threshold, the input channel signal ranked first for the previous frame (i.e., $s_{rank-1}(k-1)$) may now be ranked second if that input channel was ranked first based on its having the then-current maximum energy ratio (i.e., $ER_{Max}(k-1)$), and if that input channel has not been ranked first for the current frame k. If these conditions are not satisfied, the input channel signal ranked second for the previous frame (i.e., $s_{rank-2}(k-1)$) may be maintained as the second-ranked channel, provided the second-ranked input channel signal for the previous frame has not been ranked first for the current frame k. And if the second-ranked input channel signal for the previous frame has been ranked first for the current frame, the input channel signal with the largest SNR aside from that of the first-ranked input channel signal (e.g., the second-largest SNR) may be ranked second.

Returning to ranking an input channel signal as the first-ranked signal, presume that the largest frame energy ratio does not exceed the first predefined threshold (or does for the previous frame), or that the input channel signal with the largest frame energy ratio does not also have the largest SNR and short-term-to-long-term-energy ratio. In such instances, the input channel signal with the largest signal-to-noise ratio (i.e., $SNR_n(k)=SNR_{Max}(k)$) may be ranked first if, after the attack time, the respective input channel signal also has the largest short-term-to-long-term-energy ratio (i.e., $ER_{short-to-long,n}(k)=ER_{short-to-long,Max}(k)$). Otherwise, the input channel signal ranked first for the previous frame (i.e., $s_{rank-1}(k-1)$ is maintained as the first ranked signal (i.e., $s_{rank-1}(k)$). The second-ranked input channel signal (i.e., $s_{rank-2}(k)$) may then be determined in a manner similar to that above, beginning with a look at the first-ranked input channel signal for the previous frame and whether it was ranked first based on its having the then-current maximum energy ratio (i.e., $ER_{Max}(k-1)$).

The aforementioned technique may continue for ranking the remaining input channel signals third through Nth. Alternatively, however, the remaining input channel signals may be ranked third through Nth based on their respective SNR features, such as by ranking the remaining input channel signals from largest to smallest SNR.

As or after the signal ranking element 90 ranks the input channel signals, the signal ranking element may output the ranked input channel signals to a mixing element 92 for mixing the signals according to their rankings and a set of mixing gains corresponding to their rankings. As indicated above, the set of mixing gains according to which the ranked input channel signals are mixed may be obtained from a mixing table depending on the particular class of speech activity, as determined by the VAD, STD and DTD elements 82, 84, 86 and 88. In this regard, the signal ranking element may maintain a mixing table for each class of speech activity, where the mixing tables may be designed in accordance with the principles above. In the context of six proximity-network participants 72 and thus six input channels (N=R=6), for example, tables of gains [$g_1$ $g_2$ $g_3$ $g_4$ $g_5$ $g_6$] for respective classes of speech activity may include the following:

a) Speech pause: [1 0.2 0 0 0 0] (if comfort noise added: [0 0 0 0 0 0]);

b) Transmitter talk: [1 0.7 0 0 0 0];

c) Simultaneous talk: [1 1 0.7 0 0 0];

d) Receiver talk: [1 0.2 0 0 0 0] (if comfort noise added: [0 0 0 0 0 0]);

e) Doubletalk: [1 0.8 0.7 0 0 0]; and f) Simultaneous/double talk: [1 1 0.7 0 0 0]

Having identified the appropriate mixing table from the classification of speech activity for the current frame k, the mixing element 92 may calculate a weighted sum of the ranked input channel signals to thereby mix the ranked input channel signals. More particularly, and notationally, the mixing element may mix the ranked input channel signals into an output $S_{mix}(k)$ in accordance with the following:

$$s_{mix}(k) = \sum_{r=1}^{R} g_r s_{rank-r}(k)$$

From the above, it may be shown that if all of the gains $g_r$ are set to 1, the output corresponds to a non-weighted sum of the ranked input channel signals (implementing a summation process). And if only the first-ranked input channel signal $s_{rank-1}(k)$ has an associated, non-zero gain $g_1$ (i.e., $\forall_{r>1}$, $g_r=0$), and that gain is set to 1 (i.e., $g_r=1$), the output corresponds to the first-ranked input channel signal (implementing a single-selection process).

The aforementioned elements of the mixer 78 may function on a per-frame basis. And as such, the values of the extracted features and speech activity classification, and thus ranking and mixing, may change from one frame to the next. In such instances, however, the change from one set of gains to another set, or from one gain for a particular-ranked input channel signal to another gain, may be implemented in a smooth manner in accordance with a parameter that defines the slope of the changing gain.

As explained above, the mixer 78 may further implement automatic volume control (AVC) to equalize the signal volume levels. Reference is now made to FIG. 6, which illustrates a functional block diagram of a mixer further including an AVC element 94, in accordance with another exemplary embodiment of the present invention. The mixer of this exemplary embodiment may function in a manner similar to that of the embodiment of FIG. 5. In contrast to the mixer of FIG. 5, however, the AVC element of the mixer of FIG. 6 may be configured for equalizing the ranked input channel signals before their mixing by the mixing element 92. The AVC element may be configured for equalizing the ranked input channel signals in accordance with any of a number of different techniques, at least some of which are well known to those skilled in the art. More particularly, for example, techniques by which the AVC element may be configured for equalizing the ranked input channel signals may include time-domain-based techniques that adjust the level of one or more of the input channel signals for a frame by a predefined gain if the first VAD 82 classifies the frame as transmitter talk ($VAD_{Tx}=1$), or if the STD 84 classifies the frame as simultaneous talk. The predefined gain in such techniques may be estimated from a long-term signal level and a target level, such as to thereby bring the level of the first-ranked input channel signal to the target level for transmitter talk, or bring the levels of the top-ranked input channel signals (e.g., top two ranked input channel signals) to the target level for simultaneous talk.

Reference is now drawn to FIG. 7, which illustrates a flowchart including various steps in a method of establishing and effectuating a conference session between a number of participants 72 at a plurality of locations 74. For purposes of illustration and without loss of generality, the participants of the conference session include a plurality of participants 72a-72d located at two locations as shown in FIG. 4, where participants 72a-72c are located at the first location, and participant 72d is located at the second location. Now, as shown in block 100, a method according to one exemplary embodiment of the present invention includes the participants at one or more locations establishing proximity networks 76 at those respective locations. For example, participants 72a-72c at the first location can establish a Bluetooth network at the first location, where participant 72c functions as the master of the proximity network, and participants 72a and 72b function as slaves.

Before, after or as the proximity network(s) 76 are established at the respective locations 74, the participants 72 at the locations can establish a conference session therebetween, as shown in block 102. The conference session can be established in any of a number of different manners, including in a distributed arrangement or in a centralized arrangement via a conferencing server 24, as shown in FIG. 4. Irrespective of exactly how the conference session is established between the participants, the conference session can thereafter be effectuated or otherwise carried out by the participants, with the participants exchanging voice communication between one another. As the conference session is effectuated, the participants can generate and exchange respective signals representative of speech activity near the respective participants' devices, as shown in block 104. As will be appreciated, the signals can be generated in any of a number of different manners, such as via audio picked up by appropriate user input interface elements (e.g., microphones 56) of respective participants.

The signals representative of speech activity in proximity to respective participants may also be exchanged in any of a number of different manners. For example, the signals may be exchanged via channels between respective locations, so that speech activity from location(s) may be output by an appropriate user interface elements (e.g., speakers 39, speakers 50, etc.) of respective participant(s). In accordance with exemplary embodiments of the present invention, however, the signals of participants within the proximity network may be mixed and output on a single channel for receipt by the participant(s) outside the proximity network.

More particularly, the mixer 78 of the master of the proximity network 76 may mix the signals generated by the master and slave(s) of the proximity network, and output one or more mixed signals on one or more channels, such as by outputting a mixed signal on a mono-channel, between the respective location 74 and the other location(s). Thus, in addition to receiving signal(s) from participants outside the proximity network (see block 106), the master of the proximity network, or more particularly the mixer of the master, may also receive signal(s) from respective slave(s) of the proximity network, as shown in block 108. As shown in FIG. 4, for example, master participant 72c may receive the signal generated by participant 72d at the second location, as well as the signals from respective slave participants 72a and 72b within the proximity network at the first location 74 (the slave signals being received, e.g., via the proximity network).

As the master of the proximity network 76 receives signals from the other participants 72, both within and outside the proximity network, the respective mixer 78 may classify speech activity of the conference session based thereon, as shown in block 110. In this regard, the mixer may, for example, classify speech as a speech pause, transmitter talk, simultaneous talk, receiver talk, double talk or simultaneous/double talk. Then, after classifying the speech activity of the conference session, the mixer may mix the signals of the participants within the proximity network (including the master and slave(s)) based thereon, as shown in block 112. The mixer may mix the signals in a number of different manners, such as in the manner explained above (including ranking the respective signals). Thereafter, the mixer may output the mixed signal for receipt by the participant(s) outside the proximity network at other location(s), thereby at least partially effectuate the exchange of signals between participants of the conference session, as shown in block 114.

As shown at block 116, the session can then continue with the participants 72 continuing to generate and exchange signals, including the master of the proximity network 76 mixing the signals of the participants within the proximity network to a single output for exchanging with the participant(s) outside the proximity network. At one or more points during the conference session, one or more participants may desire to end the conference session. At such instances, then, those participants can close their connection to the conference session, as shown in block 118. Closing the conference session, then, may close the communication sessions previously established between the participants and the conferencing server 24 (in instances including a conferencing server).

As explained above, the mixer 78 may support a number of participants 72 supplying respective input channel signals. It should be understood that the mixer may support a variable number of input channel signals, which may dynamically change during any conference session when new participants join the conference session, or existing participants terminate or otherwise drop out of the conference session. Further, the mixer may be configured to limit its mixing to a subset of the input channel signals, with any remaining input channel signals being dropped from the mixing with other input channel signals.

As also explained above, at one or more of the remote locations 74, at least some of the participants 72 of the respective location (common acoustic space) may establish a proximity network 76 for the exchange of voice communication, with a master participant (e.g., participant 72c) being configured for operating a mixer 78 for mixing the signals of the participants of the respective proximity network. In another configuration, however, the mixer may be embodied or otherwise configured for operation with in a participant located remote from the participants whose signals are mixed thereby. And in yet another configuration, the mixer may be embodied or otherwise configured for operation within a conferencing server 24. In such instances, for example, the participants may connect to a remote entity (e.g., participant or conferencing server remote therefrom) including the mixer for mixing their signals, such as in accordance with packet or circuit-switch-based technology. In this regard, the participants may make a 3G call to a conferencing server including a mixer configured for mixing their signals.

According to one aspect of the present invention, the functions performed by one or more of the entities of the system, such as the participants 72 (e.g., terminal 10, computing system 22, etc.) and/or conferencing server 24 may be performed by various means, such as hardware and/or firmware, including those described above, alone and/or under control of a computer program product (e.g., mixer 78, etc.). The computer program product for performing one or more functions of embodiments of the present invention includes a computer-readable storage medium, such as the non-volatile storage medium, and software including computer-readable program code portions, such as a series of computer instructions, embodied in the computer-readable storage medium.

In this regard, FIGS. 5, 6 and 7 are functional block diagrams and a flowchart of methods, systems and program products according to the invention. It will be understood that each block or step of the functional block diagrams and flowchart, and combinations of blocks in the functional block diagrams and flowchart, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the functional block diagrams' and flowchart's block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the functional block diagrams' and flowchart's block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the functional block diagrams' and flowchart's block(s) or step(s).

Accordingly, blocks or steps of the functional block diagrams and flowchart support combinations of means for performing the specified functions, combinations of steps for performing the specified functions and program instruction means for performing the specified functions. It will also be understood that one or more blocks or steps of the functional block diagrams and flowchart, and combinations of blocks or steps in the functional block diagrams and flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
   at least one processor; and
   at least one memory including computer program code,
   the at least one memory and the computer program code configured to, with the at least one processor, cause the apparatus to at least:
   cause reception of a plurality of signals during a conference session between a plurality of participants including a plurality of local participants at one location and one or more remote participants located at another, remote location, the signals being representative of voice communication of the participants,
   classify speech activity of the conference session based on the signals, the speech activity being classified into a plurality of distinct classes reflecting a presence or absence of one or more actively-speaking participants and the one or more actively-speaking participants being local or remote participants, said distinct classes comprising speech pause being no actively speaking participants, transmitter talk being one local actively speaking participant, simultaneous talk being multiple local actively speaking participants, receiver talk being one remote actively speaking participant, double talk being one local actively speaking participant and one remote actively speaking participant, and simultaneous/double talk being multiple local actively speaking participants and one or more remote actively speaking participants; and mix the signals of the respective local participants into at least one mixed signal for output to the one or more remote participants, the signals being mixed based upon classification of the speech activity.

2. The apparatus of claim 1, wherein the apparatus is caused to mix the signals of the local participants according to a set of gains from a mixing table, the mixing table being selectable from a plurality of mixing tables based upon the classification of the speech activity.

3. The apparatus of claim 2, wherein the set of gains according to which the signals are mixed includes a plurality of gains greater than zero.

4. The apparatus of claim 2, wherein the plurality of mixing tables includes a mixing table for each of the plurality of classes of speech activity, and wherein the apparatus being caused to mix the signals includes being caused to select the mixing table for the each of the plurality of classes into which the speech activity is classified, and mix the signals according to the selected mixing table.

5. The apparatus of claim 4, wherein the set of gains of the mixing table for the transmitter talk class includes a first gain for an actively-speaking local participant and a second, lower gain for others of the local participants, wherein the set of gains of the mixing table for the double talk class includes a third gain for an actively-speaking local participant and a fourth, lower gain for others of the local participants, and wherein the fourth gain is greater than the second gain.

6. The apparatus of claim 1, wherein the at least one memory and the computer program code are further configured to, with the at least one processor, cause the apparatus to further:

rank the signals of the local participants based upon one or more features thereof, one or more features reflective of a likelihood of an actively-speaking participant such that higher-ranked signals are reflective of a higher likelihood of an actively-speaking participant, and wherein the apparatus is caused to mix the ranked signals.

7. The apparatus of claim 6, wherein the apparatus being caused to mix the signals includes being caused to associate the gains of a set of gains with respective signals of the local participants, and wherein the apparatus is caused to rank the signals such that larger gains of the set of gains are associated with higher-ranked signals.

8. The apparatus of claim 1, wherein the apparatus is caused to cause reception of the plurality of signals including signals received from local apparatuses of the local participants, each of at least some of the local apparatuses otherwise being configured for voice communication independent of at least some of the other local apparatuses.

9. The apparatus of claim 8, wherein the apparatuses of the local participants are all connected to a proximity network, and wherein the apparatus is caused to mix the signals of the local participants with local apparatuses connected to the proximity network into at least one mixed signal for output to a remote apparatus of a remote participant outside the proximity network.

10. An apparatus for effectuating a conference session between participants at a plurality of locations, the apparatus comprising:

a first means for causing reception of a plurality of signals during a conference session between a plurality of participants including a plurality of local participants at one location and one or more remote participants located at another, remote location, the signals being representative of voice communication of the participants;

a second means for classifying speech activity of the conference session based on the signals, the speech activity being classified into a plurality of distinct classes reflecting a presence or absence of one or more actively-speaking participants and the one or more actively-speaking participants being local or remote participants; said distinct classes comprising speech pause being no actively speaking participants, transmitter talk being one local actively speaking participant, simultaneous talk being multiple local actively speaking participants, receiver talk being one remote actively speaking participant, double talk being one local actively speaking participant and one remote actively speaking participant, and simultaneous/double talk being multiple local actively speaking participants and one or more remote actively speaking participants; and a third means for mixing the signals of the local participants into at least one mixed signal for output the one or more remote participants, the signals being mixed based upon classification of the speech activity.

11. The apparatus of claim 10, wherein the third means is for mixing the signals of the local participants according to a set of gains from a mixing table, the mixing table being selectable from a plurality of mixing tables based upon the classification of the speech activity.

12. The apparatus of claim 11, wherein the set of gains according to which the signals are mixed includes a plurality of gains greater than zero.

13. The apparatus of claim 11, wherein the plurality of mixing tables includes a mixing table for each of the plurality of classes of speech activity, and wherein the third means is for mixing the signals including selecting the mixing table for the each of the plurality of classes into which the speech activity is classified, and mixing the signals according to the selected mixing table.

14. The apparatus of claim 13, wherein the set of gains of the mixing table for the transmitter talk class includes a first gain for an actively-speaking local participant and a second, lower gain for others of the local participants, wherein the set of gains of the mixing table for the double talk class includes a third gain for an actively-speaking local participant and a fourth, lower gain for others of the local participants, and wherein the fourth gain is greater than the second gain.

15. The apparatus of claim 10 further comprising: a fourth means for ranking the signals of the local participants based upon one or more features thereof, the one or more features reflective of a likelihood of an actively-speaking participant such that higher-ranked signals are reflective of a higher likelihood of an actively-speaking participant, wherein the third means is for mixing the ranked signals.

16. The apparatus of claim 15, wherein the third means is for mixing the signals including associating the gains of a set of gains with respective signals of the local participants, and wherein the fourth means is for ranking the signals such that larger gains of the set of gains are associated with higher-ranked signals.

17. The apparatus of claim 10, wherein the first means is for causing reception of the plurality of signals including signals received from local apparatuses of the local participants, each of at least some of the local apparatuses otherwise being configured for voice communication independent of at least some of the other local apparatuses.

18. The apparatus of claim 17, wherein the local apparatuses of the local participants are all connected to a proximity network, and
    wherein the third means is for mixing the signals of the local participants with local apparatuses connected to the proximity network into at least one mixed signal for output to a remote apparatus of a remote participant outside the proximity network.

19. A method of effectuating a conference session between participants at a plurality of locations, the method comprising:
    causing reception of a plurality of signals during a conference session between a plurality of participants including a plurality of local participants at one location and one or more remote participants located at another, remote location, the signals being representative of voice communication of the participants;
    classifying speech activity of the conference session based on the signals, the speech activity being classified into a plurality of distinct classes reflecting a presence or absence of one or more actively-speaking participants and the one or more actively-speaking participants being local or remote participants; said distinct classes comprising speech pause being no actively speaking participants, transmitter talk being one local actively speaking participant, simultaneous talk being multiple local actively speaking participants, receiver talk being one remote actively speaking participant, double talk being one local actively speaking participant and one remote actively speaking participant, and simultaneous/double talk being multiple local actively speaking participants and one or more remote actively speaking participants; and
    mixing the signals of the local participants into at least one mixed signal for output to the one or more remote participants, the signals being mixed based upon classification of the speech activity.

20. The method of claim 19, wherein the signals of the local participants are mixed according to a set of gains from a mixing table, the mixing table being selectable from a plurality of mixing tables based upon the classification of the speech activity.

21. The method of claim 20, wherein the set of gains according to which the signals are mixed includes a plurality of gains greater than zero.

22. The method of claim 20, wherein the plurality of mixing tables includes a mixing table for each of the plurality of classes of speech activity, and
    wherein mixing the signals includes selecting the mixing table for the each of the plurality of classes into which the speech activity is classified, and mixing the signals according to the selected mixing table.

23. The method of claim 22,
    wherein the set of gains of the mixing table for the transmitter talk class includes a first gain for an actively-speaking local participant and a second, lower gain for others of the local participants,
    wherein the set of gains of the mixing table for double talk second class includes a third gain for an actively-speaking local participant and a fourth, lower gain for others of the local participants, and wherein the fourth gain is greater than the second gain.

24. The method of claim 19 further comprising: ranking the signals of the local participants based upon one or more features thereof, the one or more features reflective of a likelihood of an actively-speaking participant such that higher-ranked signals are reflective of a higher likelihood of an actively-speaking participant,
    wherein mixing the signals comprises mixing the ranked signals.

25. The method of claim 24, wherein mixing the signals includes associating the gains of a set of gains with respective signals of the local participants, and
    wherein the signals are ranked such that larger gains of the set of gains are associated with higher-ranked signals.

26. The method of claim 19, wherein causing reception of the plurality of signals includes signals received from local apparatuses of the local participants, each of at least some of the local apparatuses otherwise being configured for voice communication independent of at least some of the other local apparatuses.

27. The method of claim 26, wherein the local apparatuses of the local participants are all connected to a proximity network, and
    wherein mixing the signals comprises mixing the signals of the local participants with local apparatuses connected to the proximity network into at least one mixed signal for output to a remote apparatus of a remote participant outside the proximity network.

28. A non-transitory computer-readable storage medium for effectuating a conference session between participants at a plurality of locations, the computer-readable storage medium having computer-readable program code portions stored therein, the computer-readable storage medium and computer-readable program code portions being configured to, with at least one processor, cause an apparatus to at least:
    cause reception of a plurality of signals during a conference session between a plurality of participants including a plurality of local participants at one location and one or more remote participants located at another, remote location, the signals being representative of voice communication of the participants;
    classify speech activity of the conference session based on the signals, the speech activity being classified into a plurality of distinct classes reflecting a presence or absence of one or more actively-speaking participants and the one or more actively-speaking participants being local or remote participants; said distinct classes comprising speech pause being no actively speaking participants, transmitter talk being one local actively speaking participant, simultaneous talk being multiple local actively speaking participants, receiver talk being one remote actively speaking participant, double talk being one local actively speaking participant and one remote actively speaking participant, and simultaneous/double talk being multiple local actively speaking participants and one or more remote actively speaking participants; and
    mix the signals of the local participants into at least one mixed signal for output to the one or more remote participants, the signals being mixed based upon classification of the speech activity.

29. The non-transitory computer-readable storage medium of claim 28, wherein the apparatus is caused to mix the signals of the local participants according to a set of gains from a mixing table, the mixing table being selectable from a plurality of mixing tables based upon the classification of the speech activity.

30. The non-transitory computer-readable storage medium of claim 29, wherein the set of gains according to which the signals are mixed includes a plurality of gains greater than zero.

31. The non-transitory computer-readable storage medium of claim 29, wherein the plurality of mixing tables includes a mixing table for each of the plurality of classes of speech activity, and
    wherein the apparatus being caused to mix the signals includes being caused to select the mixing table for the each of the plurality of classes into which the speech activity is classified, and mix the signals according to the selected mixing table.

32. The non-transitory computer-readable storage medium of claim 31,
    wherein the set of gains of the mixing table for the transmitter talk class includes a first gain for an actively-speaking local participant and a second, lower gain for others of the local participants,
    wherein the set of gains of the mixing table for double talk second class includes a third gain for an actively-speaking local participant and a fourth, lower gain for others of the local participants, and wherein the fourth gain is greater than the second gain.

33. The non-transitory computer-readable storage medium of claim 28, wherein the computer-readable storage medium and computer-readable program code portions are further configured to, with the at least one processor, cause the apparatus to further:
    rank the signals of the local participants based upon one or more features thereof, the one or more features reflective of a likelihood of an actively-speaking participant such that higher-ranked signals are reflective of a higher likelihood of an actively-speaking participant,
    wherein the apparatus is caused to mix the ranked signals.

34. The non-transitory computer-readable storage medium of claim 33, wherein the apparatus being caused to mix the signals includes being caused to associate the gains of a set of gains with respective signals of the local participants, and
    wherein the apparatus is caused to rank the signals such that larger gains of the set of gains are associated with higher-ranked signals.

35. The non-transitory computer-readable storage medium of claim 28, wherein the apparatus is caused to cause reception of the plurality of signals including signals received from local apparatuses of the local participants, each of at least some of the local apparatuses otherwise being configured for voice communication independent of at least some of the other local apparatuses.

36. The non-transitory computer-readable storage medium of claim 35, wherein the local apparatuses of the local participants are all connected to a proximity network, and
    wherein the apparatus is caused to mix the signals of the local participants with local apparatuses connected to the proximity network into at least one mixed signal for output to a remote apparatus of a remote participant outside the proximity network.

* * * * *